Sept. 15, 1970  R. A. FIKE ET AL  3,528,793
SINGLE STAGE FORMING OF GLASS CONTAINER IN NECK RING ARM MOLD
Filed Nov. 22, 1966  2 Sheets-Sheet 1

INVENTOR.
ROY A FIKE
WILLIAM C FOTOPLES
ATTORNEYS

United States Patent Office 3,528,793
Patented Sept. 15, 1970

3,528,793
SINGLE STAGE FORMING OF GLASS CONTAINER IN NECK RING ARM MOLD
Roy A. Fike, Pevely, Mo., and William C. Fotoples, Toledo, Ohio, assignors to Owens-Illinois, Inc., a corporation of Ohio
Filed Nov. 22, 1966, Ser. No. 596,245
Int. Cl. C03b 9/14, 9/00
U.S. Cl. 65—77                                                    10 Claims

ABSTRACT OF THE DISCLOSURE

A complete, finished, container is formed at a single station on the well-known I.S. Bottle Forming Machine by using a unitary mold carried by the invert arm, which mold compares to the neck and parison molds of the conventional machine. A gob of glass is loaded through the open, upper end of the split mold and the gob or charge is "settle-blown" around a neck pin and then, with a baffle replacing the "settle blow" head, the charge is counterblown into a finished bottle. The entire mold is inverted and opened, releasing the finished container.

This invention relates to a method and apparatus for forming glass containers in a single stage. More particularly, this invention is directed to a single stage forming process wherein the bottle is formed to its final shape and size on what is conventionally the blank mold side of a well-known glass forming machine, namely, the I.S. bottle forming machine, an example of which is shown in U.S. Pat. No. 2,273,777.

The present invention is distinguished from the prior art by the fact that the invert arm of the glass forming machine carries a split, combined neck and body mold wherein the glass container is fully formed and invert of the arm is carried out in the usual manner with the combined or integral neck mold and body mold being inverted with the ware. After the inversion is completed, the mold is opened to release the formed container to the bottom plate. The bottom plate may have vacuum connected thereto so as to aid in holding the container in an upright position. After the mold is opened, it is reverted to its former position preparatory to receiving a successive gob of molten glass for forming another container.

In the prior art a parison or preform is made in a blank mold which is separate from the neck mold and after the parison is formed the blank mold is opened leaving the parison held by the neck, at which time the neck mold is inverted with the parison to a position where the parison is enclosed within a blow mold and then expanded to final bottle form. The expansion of the parison may be accomplished through the neck mold or the neck mold after, inverting and transferring the parison to the blow mold may open and release the neck of the bottle at the blow station, at which time it is reverted preparatory to forming a successive parison and a separate blow head is utilized to expand the parison within the blow mold. After the bottle is formed, the blow mold is opened and the bottle is normally lifted by its neck from the bottom plate and carried to a conveyor for subsequent heat treatment.

With the foregoing in view, it is an object of this invention to form a container in its entirety in what is normally considered the parison forming cycle of a forming machine and subsequently inverting the neck and body mold and then releasing the ware to a bottom plate.

It is a further object of this invention to provide mechanism which forms a container in one stage of a glass forming cycle.

It is a still further object of this invention to provide a method and apparatus for forming a container within a split, neck and body mold in inverted position and after forming, to invert the mold, open the mold and release the completely formed container in an upright position.

Other and further objects will be apparent from the following description taken in conjunction with the annexed sheets of drawings, wherein.

With particular reference to the drawings, the apparatus of the invention will be described.

Figure 1:
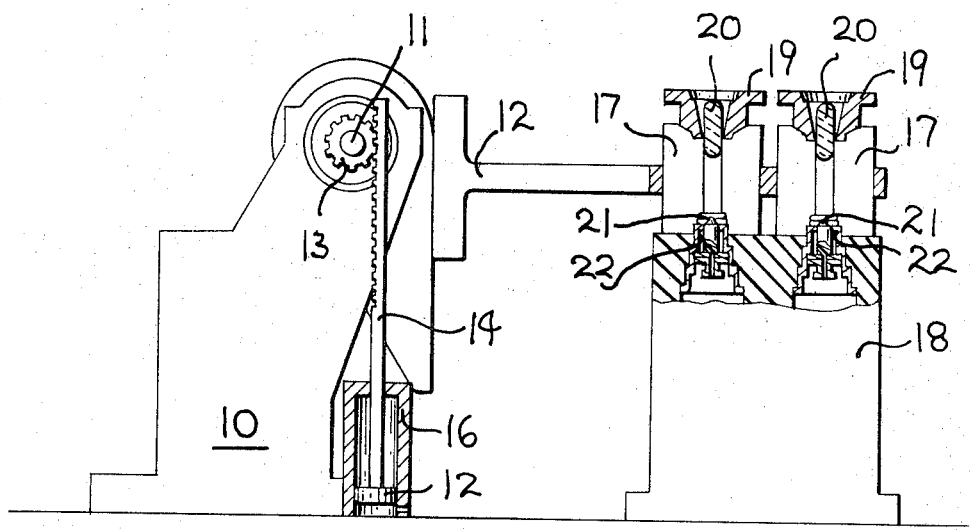
FIG. 1 is a side elevational view, partly in section, of the molding apparatus of the invention illustrating the loading of a charge of molten glass into the molds.
Figure 4:
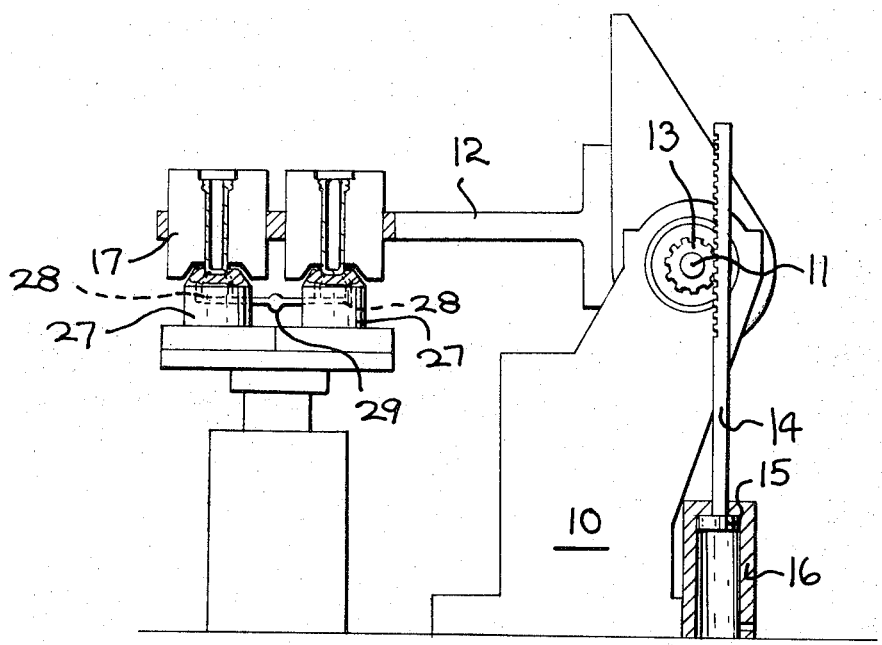

A supporting base member 10 serves as the support for a horizontal axle 11 of an invert arm 12. The axle of the invert arm carries a pinion 13 fixed thereto and the pinion is in mesh with a vertical rack 14. The rack 14, as best shown in FIGS. 1 and 4, is reciprocated by a piston 15 enclosed within a cylinder 16. The cylinder 16 is mounted with its axis vertical so as to vertically reciprocate the rack 14. It should be understood that the invert arm 12 is driven by the piston 15 in a counter-clockwise direction from the position shown in FIG. 1 through 180° to the position shown in FIG. 4 during its initial invert motion. Obviously, after the invert motion is completed and the ware is released by opening the molds, the arm is reverted to the position shown in FIG. 1 to begin another cycle.

The arm 12 supports, adjacent its outer end, a pair of open-ended, split, integral body and neck molds 17. Each of the molds 17 is comprised of a pair of mold halves split in a vertical plane parallel with the length of the arm 12. The molds are mounted on the arms so as to be capable of opening and closing relative to the vertical parting plane, an amount sufficient to provide clearance of the molds with respect to the formed ware, as will later be explained.

As shown in FIG. 1, with the molds closed and positioned in abutment with the upper surface of the pin supporting and operating mechanism 18, of conventional design, a pair of annular funnels 19 are seated within matching recesses formed in the upper ends of the molds 17. With the funnels in this position, charges 20 of molten glass are delivered to the funnels and the charges will be guided into the mold cavities. At the time of loading of the mold charges into the cavities, a pair of neck pins 21 individual to each cavity are positioned, as shown in FIG. 1, in the "up" position. Each neck pin 21 is guided in its reciprocable movement by an annular thimble and guide mechanism 22.

Figure 2:
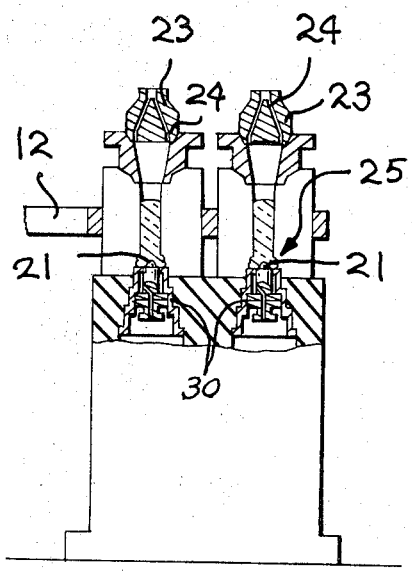
FIG. 2 is a view of the molds, similar to that of FIG. 1, illustrating the sequence of operation of the settle blow mechanism and process.

After the charge has been delivered to the molds and with the neck pins 21 positioned as shown in FIGS. 1 and 2, a pair of baffles 23 are seated in upper annular recesses formed in the funnels. The baffles 23 are provided with a plurality of passages 24 through which air under pressure is introduced to force the molten glass to the bottom of the molds in intimate relationship with respect to the neck pins 21 and the thread forming area 25 of the molds 17.

Figure 3:
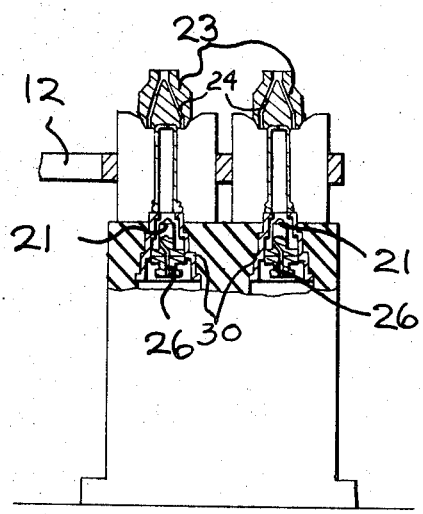
FIG. 3 is a view similar to FIG. 2, illustrating the sequence of operation wherein counter blow is used in the formation of the completed container; and, FIG. 4 is a side elevational view, partly in section, illustrating the position of the invert arm after invert with the formed containers positioned on the bottom plates.

This operation is best illustrated in FIG. 2 and is known in the art as "settle blow." After the "settle blow" has been completed, the baffles 23 are raised up out of engagement with the funnels and the funnels are removed, with the baffles being reseated against the upper ends of the molds 17, as shown in FIG. 3.

With the reseating of the baffles in the upper ends of the molds 17, the passages 24, formed within the baffles 23, are closed off since their exit ends are now abutting the solid, annular upper surface of the molds.

The neck pins 21 are retracted by mechanism (not shown) which normally takes the form of a fluid motor and air under pressure is fed through the passages 26 formed within the pins 21 so as to expand the glass within the molds 17 into hollow article forms. The retraction of the neck pins normally takes place at about the time that the "settle blow" is completed and the air fed through the passages 26 is not sequenced on until a sufficient period of time has elapsed to permit the glass which was originally in contact with the neck pin is reheated. This period of reheat, conventionally termed "corkage reheat," is the period which, it has been found, is necessary so that upon introduction of air under pressure in the area from which the neck pin is removed will result in even expansion of the glass into article shape without producing uneven wall thickness. The "corkage reheat" period under some operating sequences may be dispensed with in those situations where the "settle blow" is not in the form described above, but is functionally accomplished by the use of vacuum passages of small size opening into the finish or neck area of the mold.

With this system, termed "vacuum settle," it is not necessary that the neck pin remain in contact with the glass for a very long period of time. In actual practice where "vacuum settle" is used as the method of forcing the glass into the finish portion of the mold, the neck pin may be withdrawn almost simultaneous with the application of vacuum to the neck area since the glass forms quickly and completely fills the neck area. Thus it can be seen that if the neck pin is not in contact with the hot glass for any length of time it does not chill the corkage area and by early retraction of the neck pin, it is feasible to counter-blow without requiring any appreciable corkage reheat time.

In the situation where vacuum settle is used, it is possible to always have air under pressure connected to the passages 26 of the neck pins 21. As can be seen, when the neck pins are in the up position, as shown in FIGS. 1 and 2, the ends of the passages are effectively shut off by the positioning of the neck pins in the thimbles 30. Only upon retraction of the neck pins can the air under pressure find its way past the neck pins and effectively expand the charge of hot glass into the shape illustrated in FIG. 3. Thus, retraction of the neck pins will automatically provide the "counter-blow" air for expanding the glass into a hollow shape.

As can readily be seen, the baffles 23 serve as the portion of the mold cavity against which the bottom of the article is formed. With the completion of the forming, the baffles 23 are removed and the invert piston 15 is moved upwardly to the position shown in FIG. 4, thus causing the arm 12 to be rotated about the axle 11 through approximately 180° to the position shown in FIG. 4.

With the molds 17 in the inverted position shown in FIG. 4, the bottom of the ware will be positioned closely adjacent to or in contact with, a pair of bottom plates 27 having an upper surface which conforms to the shape of the bottom of the formed ware. To assist the bottom plates in supporting the ware unaided, it has been found that it is desirable to provide vacuum passages 28 opening in the ware bottom supporting area, as illustrated in FIG. 4. The passages 28 are connected to a vacuum header 29 and a suitable source of vacuum will be connected to the header 29.

After the ware has been transferred and inverted to the position shown in FIG. 4, the molds 17 are opened an amount sufficient to permit revert of the arm 12 and the carrying of the molds back to the position shown in FIG. 1 without disturbing the ware positioned on the bottom plates 27.

Thus it can be seen that applicants have provided a method and apparatus for forming small glass containers with threaded necks by a one-stage forming process, eliminating from the prior art process, the necessity of blowing a parison or blank.

It will be appreciated that in a normal forming cycle, the ware would be transferred from the first mold by a set of neck molds to a second set of molds where the ware would be blown into final form. It is this blowing step which has been eliminated by the foregoing process and apparatus.

Other and further modifications may be resorted to without departing from the spirit and scope of the appended claims.

We claim:

1. The method of forming hollow glass containers in a neck down position comprising the steps of positioning a split, unitary neck and body mold in inverted closed relationship with respect to a neck pin extending axially upward into the neck area of the mold, delivering a charge of glass into the open upper end of the closed mold, forcing the glass into intimate contact with the neck area of the mold and surrounding the neck pin to form the hollow neck of the container, closing off the upper end of the closed mold, retracting the neck pin and introducing air under pressure to the interior of the neck area to expand the molten glass into a hollow container shape.

2. The method of claim 1, further including the step of inverting and transferring the mold with the container enclosed to a laterally displaced position and opening the mold to release the container.

3. In the method of claim 1, wherein the step of delivering a charge of glass into the upper end of the closed mold comprises placing a funnel in axial alignment with the open upper end of the closed mold and the step of forcing the glass into contact with the neck area of the mold comprising seating a perforate baffle in axial alignment with the open upper end of the funnel and introducing air under pressure through the perforate baffle.

4. The method of claim 3, further including the steps of removing the baffle and funnel and reseating the baffle to close off the upper end of the closed mold prior to introducing air under pressure to the interior of the neck area to expand the glass into container shape.

5. The method of claim 1, further including the steps of inverting the mold through an arc of approximately 180°, opening the mold to release the container and supporting the container by its bottom only.

6. The method of claim 5, wherein the step of supporting the container by its bottom comprises positioning the container on a perforate bottom plate and applying a vacuum to the perforations in the bottom plate to securely support the container with its axis vertical.

7. The method of claim 5, further including the step of reverting the mold to its original position and closing the mold preparatory to receiving a subsequent charge.

8. Apparatus for forming hollow glass containers in a neck down position comprising an integral, split neck and body mold, an axially movable neck pin, arm means for supporting said mold in inverted closed relationship in axial alignment with respect to said neck pin, means movable into contact with the open upper end of the mold for forcing a charge of glass in the mold into intimate contact with the neck area of the integral mold and surrounding the neck pin to form the hollow interior neck portion of the container, means connected to said neck pin for retracting the neck pin and means for introducing air under pressure to the interior of the neck portion to expand the molten glass into a hollow container shape.

9. The apparatus of claim 8, further including means connected to said arm for inverting and transferring the mold with the container enclosed to a laterally displaced position and opening the mold to release the container.

10. The apparatus of claim 9, further including a perforate bottom plate mounted at said laterally displaced position adapted to receive the container and vacuum means connected to said bottom plate for holding the formed container in firm contact with the bottom plate after release from the mold.

References Cited

UNITED STATES PATENTS

| | | | |
|---|---|---|---|
| 1,405,204 | 1/1922 | Graham | 65—232 XR |
| 2,111,296 | 3/1937 | O'Neill | 65—232 XR |
| 2,466,669 | 4/1949 | Winder | 65—239 |
| 2,811,814 | 11/1957 | Winder | 65—239 |
| 3,189,422 | 6/1965 | Shea et al. | 65—229 XR |

FRANK W. MIGA, Primary Examiner

U.S. Cl. X.R.

65—78, 81, 229, 232, 235, 236, 239, 359, 262, 263